(12) United States Patent
Morrison et al.

(10) Patent No.: US 7,962,240 B2
(45) Date of Patent: Jun. 14, 2011

(54) METHODS AND SYSTEMS FOR SYNCHRONIZING A CONTROL SIGNAL OF A SLAVE FOLLOWER WITH A MASTER SOURCE

(75) Inventors: William Lindsay Morrison, Charlottesville, VA (US); Daniel H. Miller, Charlottesville, VA (US)

(73) Assignee: GE Intelligent Platforms, Inc., Charlottesville, VA (US)

( * ) Notice: Subject to any disclaimer, the term of this patent is extended or adjusted under 35 U.S.C. 154(b) by 575 days.

(21) Appl. No.: 11/961,198

(22) Filed: Dec. 20, 2007

(65) Prior Publication Data

US 2009/0160504 A1 Jun. 25, 2009

(51) Int. Cl.
*G06F 19/00* (2006.01)
(52) U.S. Cl. .......... 700/186; 700/187; 700/189
(58) Field of Classification Search .......... 700/186–187, 700/189
See application file for complete search history.

(56) References Cited

U.S. PATENT DOCUMENTS

| | | | |
|---|---|---|---|
| 3,798,430 A | 3/1974 | Simon et al. | |
| 3,949,281 A * | 4/1976 | Young, Jr. | 318/77 |
| 4,093,904 A | 6/1978 | Burig et al. | |
| 4,405,884 A | 9/1983 | Weber | |
| 4,639,172 A | 1/1987 | Kishi et al. | |
| 4,772,966 A * | 9/1988 | Sharples et al. | 386/66 |
| 4,782,449 A | 11/1988 | Brinker et al. | |
| 5,299,658 A | 4/1994 | Cox et al. | |
| 5,463,296 A | 10/1995 | Fugere et al. | |
| 5,689,161 A | 11/1997 | Fugere et al. | |
| 5,917,294 A | 6/1999 | Mitarai | |
| 6,366,045 B1 | 4/2002 | Fahrbach | |
| 6,591,158 B1 | 7/2003 | Bieterman | |
| 6,876,170 B2 | 4/2005 | Okita et al. | |
| 6,909,938 B2 * | 6/2005 | Hishikawa et al. | 700/188 |
| 6,969,961 B2 * | 11/2005 | Tolkmitt et al. | 318/34 |
| 2002/0022905 A1 | 2/2002 | Erlanoen | |

FOREIGN PATENT DOCUMENTS

| | | |
|---|---|---|
| EP | 1197821 A | 4/2002 |
| EP | 1221640 A | 7/2002 |
| EP | 1944668 A | 7/2008 |
| EP | 1956453 A | 8/2008 |

* cited by examiner

*Primary Examiner* — Ronald D Hartman, Jr.
(74) *Attorney, Agent, or Firm* — Global Patent Operation; Mark A. Conlkin

(57) ABSTRACT

A method for synchronizing a slave follower with a master source is provided. The method includes defining a relationship between the master source and the slave follower, inputting a first position of the master source, and inputting a first position of the slave follower. The method also includes defining a second position where the slave follower synchronizes with the master source, and fitting a curve between the first position of the slave follower the second position. The curve is fit based on the relationship between the master source and the slave follower, the first position of the slave follower, the first position of the master source, and the second position. The curve is fit to synchronize the slave follower and the master source without exceeding pre-determined boundaries of the slave follower.

17 Claims, 7 Drawing Sheets

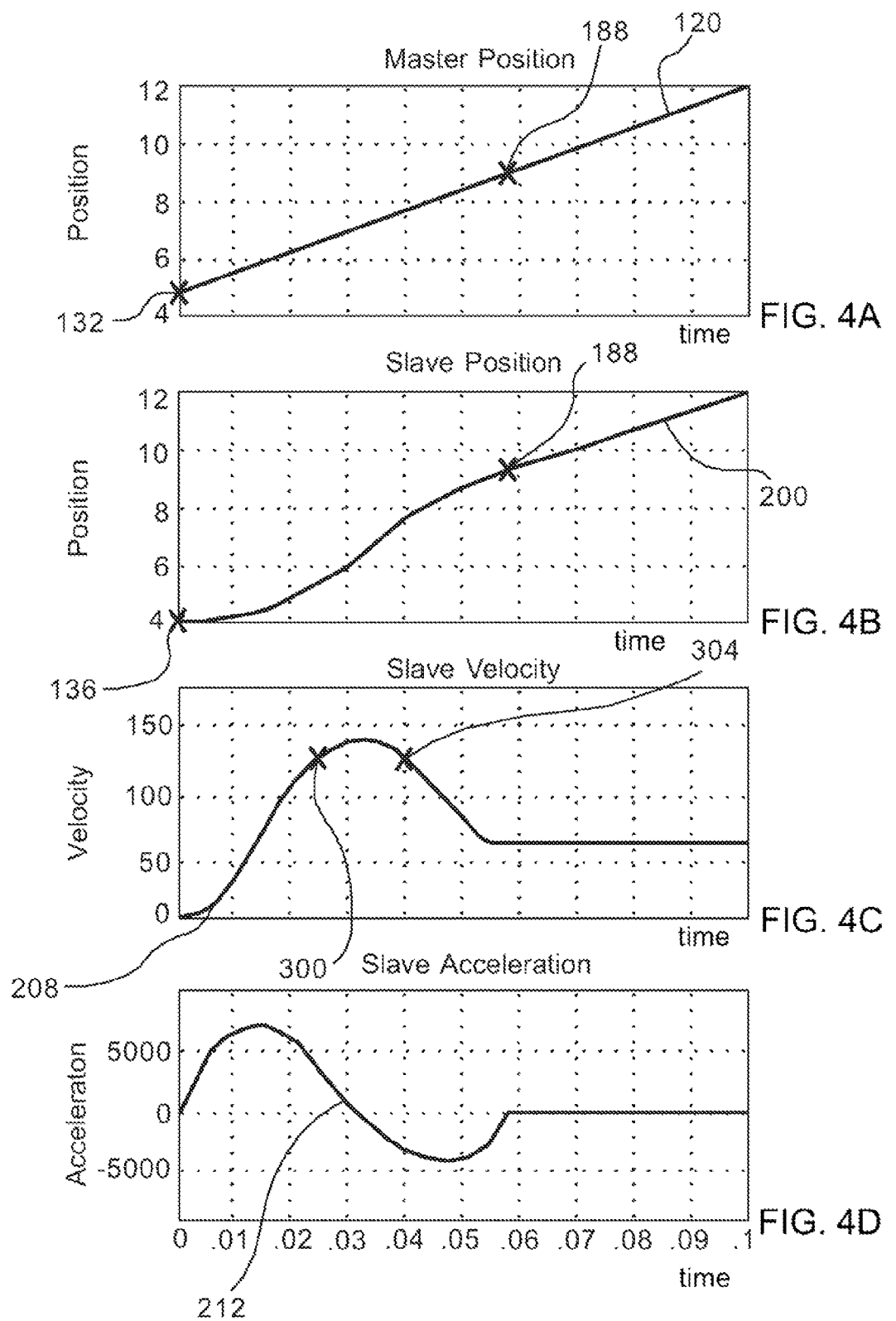

METHODS AND SYSTEMS FOR SYNCHRONIZING A CONTROL SIGNAL OF A SLAVE FOLLOWER WITH A MASTER SOURCE

BACKGROUND OF THE INVENTION

This invention relates generally to control signals, and more specifically, to methods and systems for synchronizing a control signal of a slave follower with a master source.

At least some known systems include a master source and a slave follower. Generally, the motion of the slave follower is determined by the motion of the master source. Specifically, the slave follower and the master source operate according to a position-to-position relationship. More specifically, a position of the slave follower is defined as a function of a profile of the master source. For example, the function defining the master source-slave follower relationship may dictate that when the master source is at a first position, the slave follower must be at a second position. Accordingly, during operation of the system, the position of the slave follower must track the profile of the master source based on the function defining the master source-slave follower relationship. If the slave follower begins to operate outside of the profile, the system must adjust a control signal of the slave follower such that the control signal is synchronized with the master source. For example, in a system wherein the slave follower is started after start-up of the master source, the control signal of the slave follower must be synchronized with the master profile so that the slave follower and the master source can operate according to the function defining the master source-slave follower relationship. This is sometimes known as "flying-coupling."

Typically, in known systems, the control signal of the slave follower is configured to synchronize with the master profile by defining a plurality of break points where a position of the slave follower must correspond to a particular position of the master source. In particular, upon start-up of the slave follower, the slave follower is operated at any rate necessary for the control signal of the slave follower to synchronize with the master profile at the next break point. Accordingly, the velocity and acceleration of the slave follower are relatively uncontrolled. As such, the slave follower may experience undesirable movement, such as jerk, from a sudden increase or decrease in acceleration and/or velocity. Jerk as described herein is the derivative of acceleration. Typically, this movement is unacceptable in most systems. Moreover, known methods of synchronizing the control signal of the slave follower with a master profile often require constraints to be placed on the master source and/or constraints to be lifted from the slave follower. Specifically, a velocity at which the master source moves may be reduced to allow the slave follower to synchronize with the master source. In another example, synchronizing the slave follower may require the slave follower to operate at a velocity that is beyond the capabilities of the slave follower. As such, known methods commonly violate the kinematic limits of the system.

BRIEF DESCRIPTION OF THE INVENTION

In one aspect, a method for synchronizing a slave follower with a master source is provided. The method includes defining a relationship between the master source and the slave follower, inputting a first position of the master source, and inputting a first position of the slave follower. The method also includes defining a second position where the slave follower synchronizes with the master source, and fitting a curve between the first position of the slave follower the second position. The curve is fit based on the relationship between the master source and the slave follower, the first position of the slave follower, the first position of the master source, and the second position. The curve is fit to synchronize the slave follower and the master source without exceeding pre-determined boundaries of the slave follower.

In another aspect, a system including a master source and a slave follower is provided. The system also includes a processor that is configured to synchronize the slave follower with the master source by defining a relationship between the master source and the slave follower, inputting a first position of the master source, and inputting a first position of the slave follower. The processor also defines a second position where the slave follower synchronizes with the master source, and fits a curve between the first position of the slave follower the second position. The curve is fit based on the relationship between the master source and the slave follower, the first position of the slave follower, the first position of the master source, and the second position. The curve is fit to synchronize the slave follower and the master source without exceeding pre-determined boundaries of the slave follower.

In yet another aspect, a computer program embodied on a computer-readable medium is provided. The computer program includes at least one code segment that is configured to instruct a computer to synchronize a slave follower with a master source by defining a relationship between the master source and the slave follower, inputting a first position of the master source, inputting a first position of the slave follower. The computer program also includes at least one code segment that is configured to instruct the computer to define a second position where the slave follower synchronizes with the master source, and fit a curve between the first position of the slave follower the second position. The curve is fit based on the relationship between the master source and the slave follower, the first position of the slave follower, the first position of the master source, and the second position. The curve is fit to synchronize the slave follower and the master source without exceeding pre-determined boundaries of the slave follower.

BRIEF DESCRIPTION OF THE DRAWINGS

FIG. 4A shows the master profile shown in FIG. 2A.

FIG. 4B shows a position curve that represents a position of the slave follower shown in FIG. 1.

FIG. 4C shows a velocity curve that represents a velocity of the slave follower shown in FIG. 1 as defined by the position curve shown in FIG. 4B.

FIG. 4D shows an acceleration curve that represents an acceleration of the slave follower shown in FIG. 1 as defined by the velocity curve shown in FIG. 4C.

DETAILED DESCRIPTION OF THE INVENTION

Figure 1:
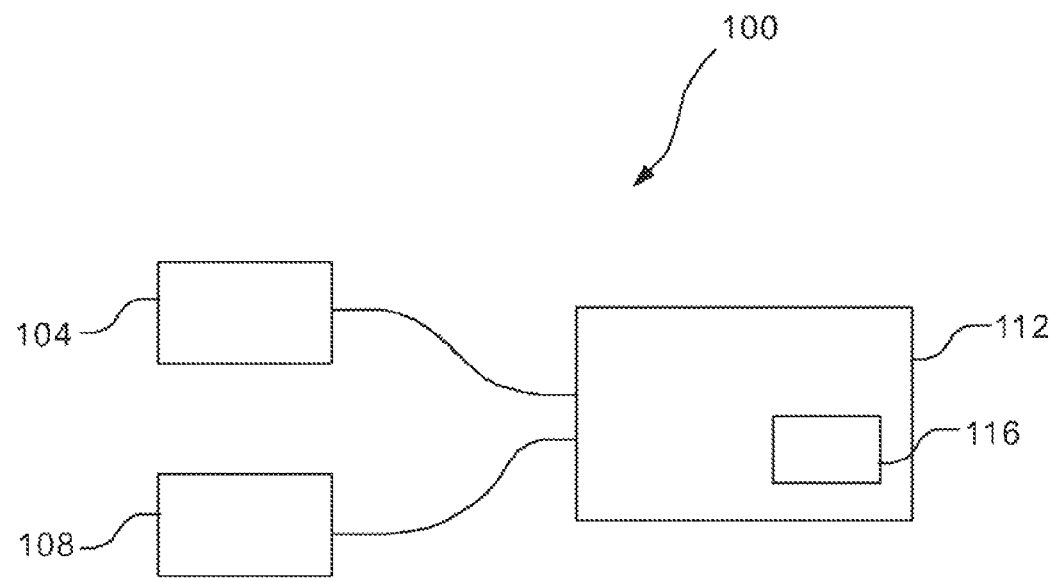
FIG. 1 is a schematic view of an exemplary system.

The present invention provides a system including a slave follower, a master source, and a computer. In one embodiment, the computer is in operational control communication with each of the slave follower and the master source. In another embodiment, the computer is only necessary to observe a signal of the master source. The technical effect of the computer is to synchronize a control signal of the slave follower with a profile of the master source using a position-to-position relationship that obeys the kinematic constraints of the slave follower. In one embodiment, the computer is instructed by a processor and/or a computer program. The technical effect of the processor and/or the computer program is to instruct the computer to synchronize the control signal with the master profile using the position-to-position relationship that obeys the kinematic constraints of the slave follower.

In the exemplary embodiment, the control signal is synchronized with the master profile by applying a quintic-hermite spline to fit a curve between a first position of the control signal and a second position where the control signal is configured to synchronize with the master profile. Accordingly, the control signal synchronizes with the master profile without placing constraints on the master source, removing constraints from the slave follower, and/or creating undesirable movement, such as jerk movement, within the slave follower. Further, in the exemplary embodiment, the curve can be adjusted to account for one or more constraints on the slave follower. For example, in one embodiment, the curve is adjusted by using quintic-hermite splines to fit one or more points within one or more portions of the curve that exceed a constraint. In a further embodiment, the curve is adjusted by operating the slave follower off the curve, operating the slave follower within the constraint while the slave follower is operated off the curve, and generating a new curve to urge the slave follower onto the original curve.

In addition, in one embodiment, the control signal is synchronized with the master profile within a time-frame that facilitates maintaining a performance of the system. In particular, the system is protected by preventing or limiting a behavior of the slave follower. Further, the system allows for a wide range of behaviors for the master source. For example, the master source may operate utilizing short or long moves, high or low velocities, and/or high or low accelerations. Moreover, the system will attempt to self-correct if the slave follower approaches or exceeds a constraint.

It should be noted that although the present invention is described with respect to a master source and a slave follower, as will be appreciated by one of ordinary skill in the art, the present invention may also apply to any system and/or any equipment that is operated in a position-to-position relationship. For example, as used herein the terms "master source" and "slave follower" may refer to, but are not limited to, motors, hydraulics, engines, and/or pneumatic devices.

Further, although the present invention is described with respect to processors and computer programs, as will be appreciated by one of ordinary skill in the art, the present invention may also apply to any system and/or program that is configured to synchronize a control signal with a master profile. For example, as used herein, the term processor is not limited to just those integrated circuits referred to in the art as processors, but broadly refers to computers, processors, microcontrollers, microcomputers, programmable logic controllers, application specific integrated circuits, and other programmable circuits. The processor may be part of a computer that may include a device, such as; a floppy disk drive or compact disc-read-only memory (CD-ROM) drive, for reading data from a computer-readable medium, such as a floppy disk, a CD-ROM, a magneto-optical disk (MOD), or a digital versatile disc (DVD).

FIG. 1 is a schematic view of an exemplary system 100. System 100 includes a master source 104, a slave follower 108, and a computer 112 that includes a processor 116. In the exemplary embodiment, computer 112 is in operational control communication with and configured to operate system 100, and in particular, master source 104 and slave follower 108. In one embodiment, processor 116 is configured to instruct computer 112 to operate system 100. Additionally or alternatively, a computer program instructs computer 112 to operate system 100.

In the exemplary embodiment, the motion of slave follower 108 is determined by the motion of master source 104. More specifically, slave follower 108 and master source 104 operate according to a position-to-position relationship, wherein a position of slave follower 108 is defined as a function of a profile of master source 104. For example, the function defining the master source-slave follower relationship may dictate that when master source 104 is at a first position, such as position "5", slave follower 108 must be at a second position, such as position "2". Accordingly, during operation of system 100, in one embodiment, the position of slave follower 108 tracks the profile of master source 104 based on the function defining the master source-slave follower relationship. If slave follower 108 begins to operate outside of a master profile, system 100 synchronizes slave follower 108 with the master profile so that system 100 continues to operate properly. For example, when slave follower 108 is started after start-up of master source 104, slave follower 108 is synchronized with the master profile so that slave follower 108 and master source 104 operate according to the function defining the master source-slave follower relationship.

Figure 2A:
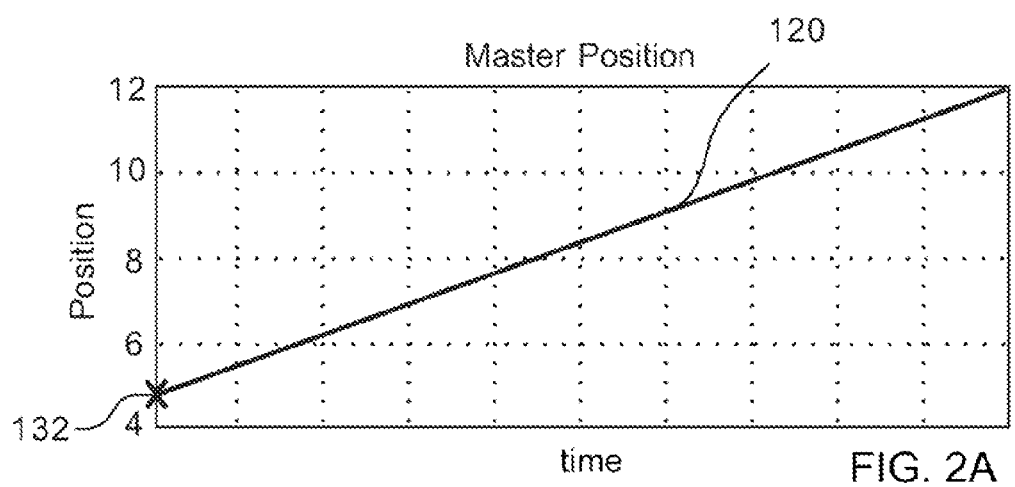
FIG. 2A shows a master profile that represents a position of the master source shown in FIG. 1 as a function of time.
Figure 2B:
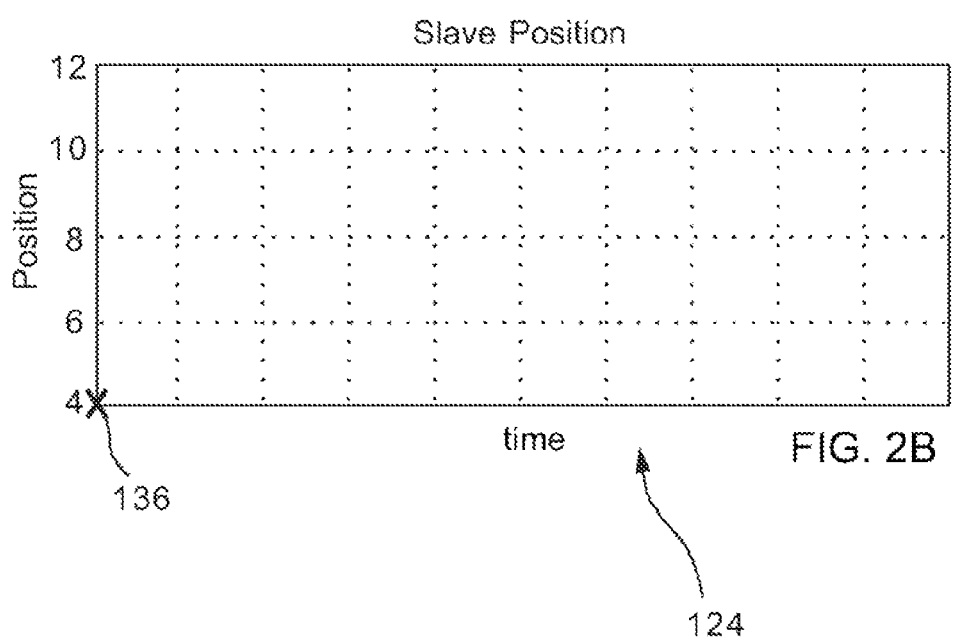
FIG. 2B shows an exemplary control signal that represents a position of the slave follower shown in FIG. 1 as a function of time.

FIG. 2A shows a master profile 120 that represents a position of master source 104 as a function of time. FIG. 2B shows an exemplary control signal 124 that represents a position of slave follower 108 as a function of time. In the exemplary embodiment, master profile 120 begins at a first position 132 that is shown in FIG. 2A as position "5." Further, control signal 124 begins at a first position 136 shown in FIG. 2B as position "4." As used herein, "first position" is defined as a position of one of master source 104 or slave follower 108 at a time that slave follower 108 is instructed to synchronize with the master profile 120. Accordingly, as will be appreciated by one of ordinary skill in the art, the slave follower 108 and/or the master source 104 may be stationary and/or moving at the time that first position 132 and first position 136 are defined.

In the exemplary embodiment, prior to operation of system 100, a position-to-position relationship is defined to relate a position of master source 104 on master profile 120 to a position of slave follower 108 on control signal 124. Specifically, this relationship defines a position of control signal 124 when master profile 120 is at a particular position. In the exemplary embodiment, control signal 124 and master profile 120 are configured to operate in a one-to-one relationship. As will be appreciated by one of ordinary skill in the art, control signal 124 and master profile 120 can be defined by any suitable relationship. In a one-to-one relationship, control signal 124 is configured to be at position "5" when master profile 120 is at position "5". However, as shown in FIGS. 2A and 2B, master profile 120 has a first position 132 of "5" at the time that control signal 124 has a first position 136 of "4." Accordingly, control signal 124 is synchronized with master profile 120.

Figure 3:
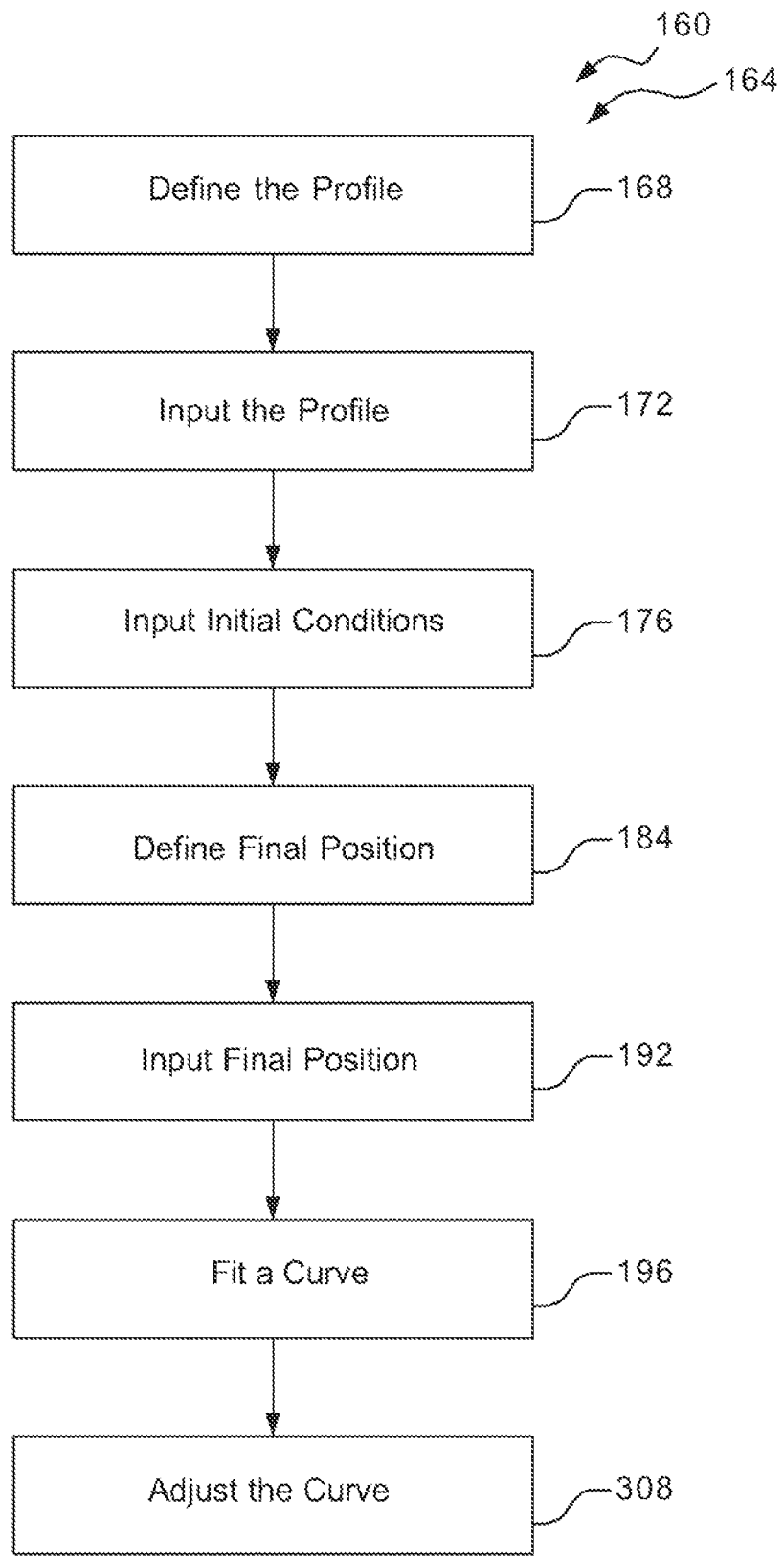
FIG. 3 is a flowchart of an exemplary method for defining a curve to synchronize a control signal, such as shown in FIG. 2B, with a master profile, such as shown in FIG. 2A.

FIG. 3 is a flowchart 160 of an exemplary method 164 for defining a curve to synchronize slave follower 108 with master profile 120. In the exemplary embodiment, method 164 includes defining 168 a profile that relates the position of master source 104 on master profile 120 to the position of slave follower 108 on control signal 124. The profile is input 172 into computer 112. Moreover, method 164 includes inputting 176 initial conditions including first position 132 of master source 104 on master profile 120 and first position 136 of slave follower 108 on control signal 124. As stated above, in the exemplary embodiment, first position 132 is "5" and first position 136 is "4." Accordingly, in the exemplary embodiment, the positions "4" and "5" are input 176 into computer 112.

In the exemplary embodiment, method 164 also includes defining 184 a second position 188 where slave follower 108 is configured to synchronize with master profile 120. In the exemplary embodiment, second position 188 is defined by the position of master profile 120 and control signal 124, and is not defined by a time, a velocity, and/or an acceleration. For example, in the exemplary embodiment, slave follower 108 is configured to synchronize with master profile 120 at a position "9." Accordingly, the position "9" is input 192 into computer 112. As will be appreciated by one of ordinary skill in the art, although second position 188 is defined as "9" in the exemplary embodiment, method 164 is capable of synchronizing control signal 124 with master profile 120 at any position.

Next, method 164 includes fitting 196 a curve between first position 136 of the control signal 124 and second position 188. FIG. 4B shows a position curve 200 that represents a position of slave follower 108 while synchronizing with master profile 120. As shown in FIG. 4B, position curve 200 has been fit 196 between first position 136 and second position 188. FIG. 4A shows master profile 120, FIG. 4B shows position curve 200, FIG. 4C shows a velocity curve 208 that represents a velocity of slave follower 108 as defined by position curve 200, and FIG. 4D shows an acceleration curve 212 that represents an acceleration of slave follower 108 as defined by velocity curve 208. In the exemplary embodiment, position curve 200 is fit 196 based on the profile, first position 136, first position 132, and second position 188. More specifically, in the exemplary embodiment, position curve 200 is fit 196 using a quintic-hermite spline to substantially eliminate undesirable movement, such as jerk, while slave follower 108 as represented by control signal 124 synchronizes with master profile 120. As used herein, jerk is defined as a substantially sudden increase or decrease in velocity and/or acceleration. Further, jerk is represented as the third derivative of a position over time curve. Accordingly, as described in more detail below, a lack of jerk is illustrated in curves 208 and 212.

Figures 5A, 5B, 5C, 5D:
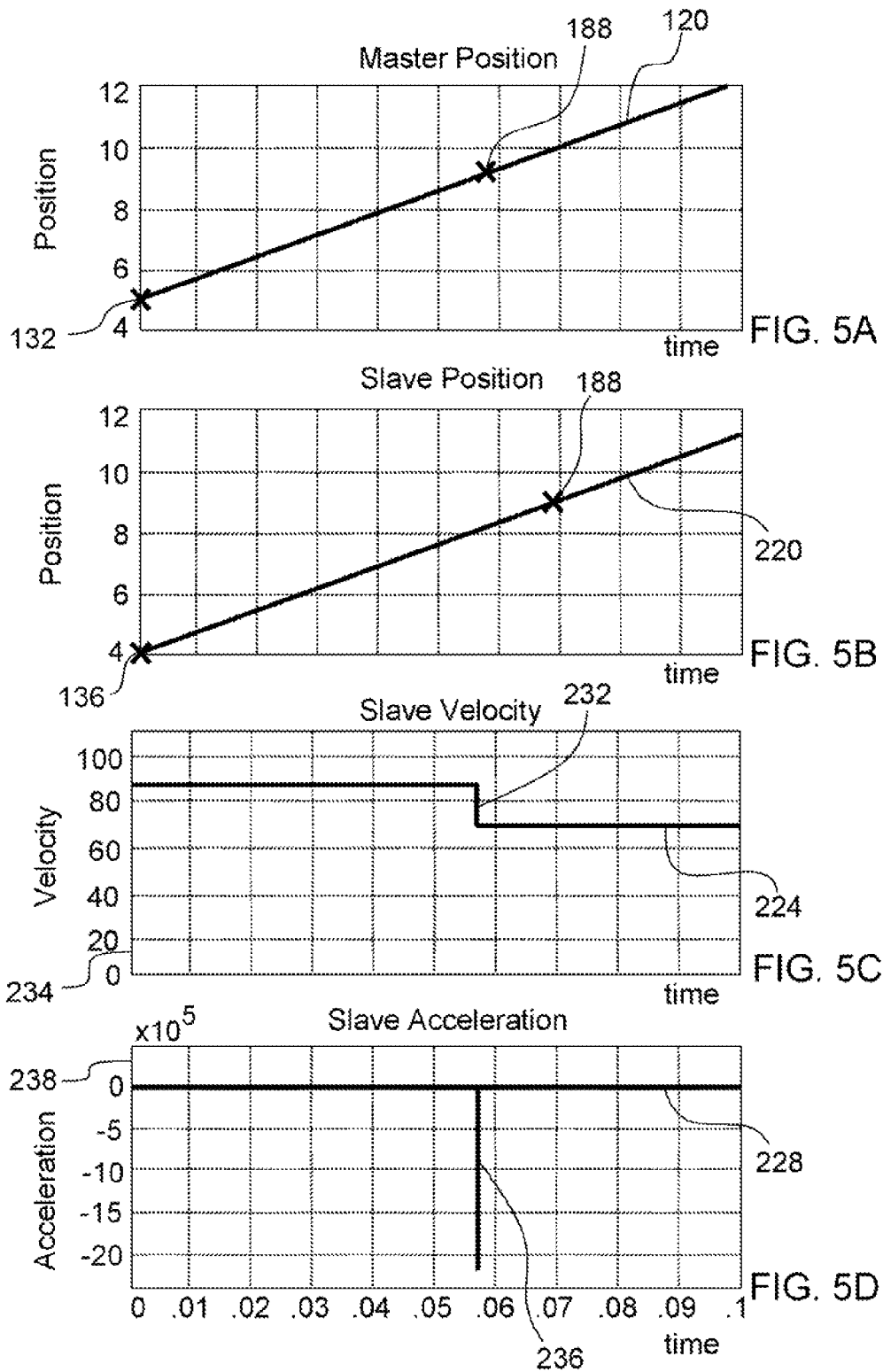
FIG. 5A shows the master profile shown in FIG. 2A.
FIG. 5B shows a slave follower position curve that represents a position of the slave follower shown in FIG. 1.
FIG. 5C shows a velocity curve that represents a velocity of the slave follower shown in FIG. 1 as defined by the position curve shown in FIG. 5B.
FIG. 5D shows an acceleration curve that represents an acceleration of the slave follower shown in FIG. 1 as defined by the velocity curve shown in FIG. 5C.

To properly describe the lack of jerk in curves 208 and 212, an example of jerk is shown in FIGS. 5A-5D. Specifically, FIG. 5A shows master profile 120, and FIG. 5B shows a slave follower position curve 220 that has been fit between first position 136 and second position 188 using a linear ramp. Specifically, position curve 220 represents a position of slave follower 108 while synchronizing with master profile 120. FIG. 5C shows a velocity curve 224 that represents a velocity of slave follower 108 as defined by position curve 220, and FIG. 5D shows an acceleration curve 228 that represents an acceleration of slave follower 108 as defined by velocity curve 224. In this example, velocity curve 224 includes a first spike 232 that occurs between times "0.05" and "0.06" when slave follower 108 synchronizes with master profile 120 at second position 188, and a second spike 234 that occurs at time "0." Spike 232 represents a sudden decrease in the velocity of slave follower 108 when slave follower 108 synchronizes with master profile 120, and spike 234 represents a sudden increase in the velocity of slave follower 108 at time "0." Accordingly, spikes 232 and 234 will cause jerk or other undesirable movement in slave follower 108 when the ramping process begins and at the time that slave follower 108 synchronizes with master profile 120. Likewise, acceleration curve 228, as shown in FIG. 5D includes a first spike 236 that occurs between times "0.05" and "0.06" when slave follower 108 synchronizes with master profile 120 at second position 188, and a second spike 238 that occurs at time "0." Spike 236 represents a sudden decrease followed by a sudden increase in the acceleration of slave follower 108 when slave follower 108 synchronizes with master profile 120, and spike 238 represents a sudden decrease in the acceleration of slave follower 108 at time "0." Accordingly, spike 236 and spike 238 may cause jerk in slave follower 108 when the ramping process begins and/or at the time that slave follower 108 synchronizes with master profile 120.

Figure 6A:
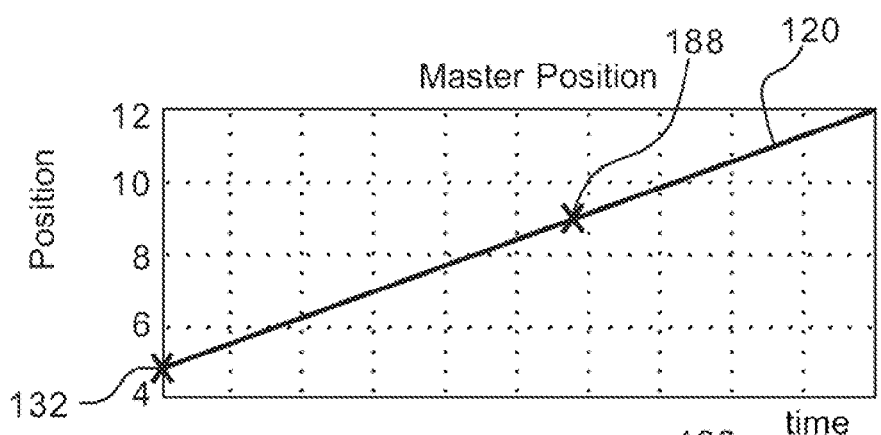
FIG. 6A shows the master profile shown in FIG. 2A.
Figure 6B:
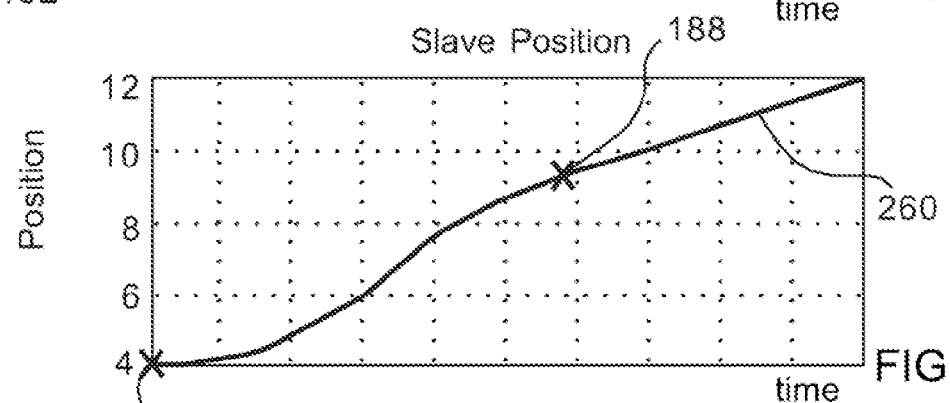
FIG. 6B shows a slave follower position curve that represents a position of the slave follower shown in FIG. 1.
Figure 6C:
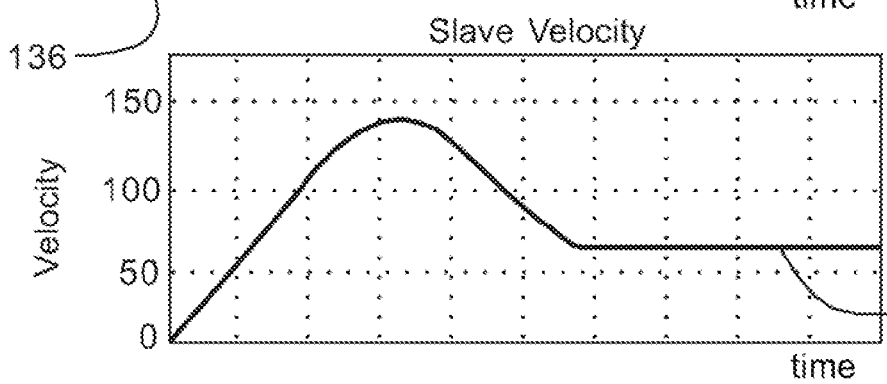
FIG. 6C shows a velocity curve 264 that represents a velocity of the slave follower shown in FIG. 1 as defined by the position curve shown in FIG. 6B.
Figure 6D:
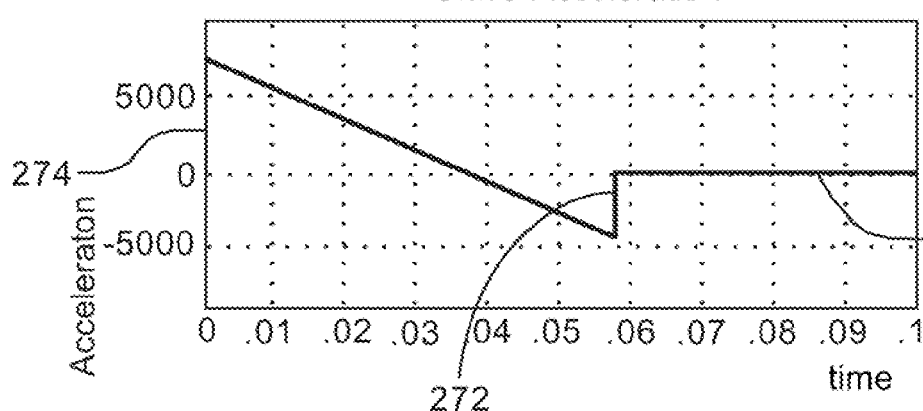
FIG. 6D shows an acceleration curve that represents an acceleration of the slave follower shown in FIG. 1 as defined by the velocity curve shown in FIG. 6C.

In another example, FIG. 6A shows position curve 120 and FIG. 6B shows a slave follower position curve 260 that has been fit between first position 136 and second position 188 using a cubic ramp. Specifically, position curve 260 represents a position of slave follower 108 while synchronizing with master profile 120. FIG. 6C shows a velocity curve 264 that represents a velocity of slave follower 108 as defined by position curve 260, and FIG. 6D shows an acceleration curve 268 that represents an acceleration of slave follower 108 as defined by velocity curve 264. In this example, the spikes, such as spikes 232 and 234 shown in FIG. 5C, have been substantially eliminated from velocity curve 264. However, acceleration curve 268 includes a first spike 272 that occurs between times "0.05" and "0.06" when slave follower 108 synchronizes with master profile 120 at second position 188, and a second spike 274 that occurs at time "0." Spike 272 represents a sudden increase in the acceleration of slave follower 108 when slave follower 108 synchronizes with master profile 120, and spike 274 represents a sudden increase in the acceleration of slave follower 108 at time "0." Accordingly, spikes 272 and 274 may cause jerk in slave follower 108 when the ramping process begins and at the time that slave follower 108 synchronizes with master profile 120.

Accordingly, referring back to FIGS. 4C and 4D, curves 208 and 212, respectively, do not include any spike that would result in jerk during any portion of the ramping process. As such, a comparison of FIGS. 4C and 4D to FIGS. 5C and 5D and FIGS. 6C and 6D shows that using a quintic spline when fitting 196 a curve between first position 136 and second position 188 substantially eliminates jerk in slave follower 108, and more generally, in system 100. Moreover, position curve 200, shown in FIG. 4B, is fit 196 and used to synchronize slave follower 108 with master profile 120 without lifting or removing constraints on slave follower 108 and/or placing constraints on master source 104. However, position curve 200 may not account for the constraints placed on slave follower 108. For example, in the exemplary embodiment, slave follower 108 is constrained by a maximum velocity of "120". Referring to FIG. 4C, when position curve 200 is fit between positions 136 and 188, slave follower 108 exceeds the maximum velocity, as shown by velocity curve 208. Specifically, the maximum velocity is exceeded between points 300 and 304. Accordingly, referring again to FIG. 3, method 164 includes a final step of adjusting 308 position curve 200 to account for a constraint on slave follower 108.

Figure 7A:
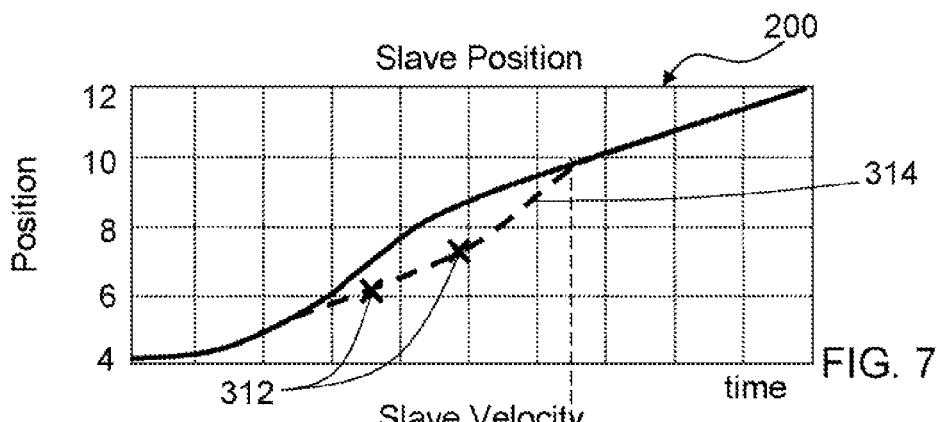
FIG. 7A shows the quintic ramp shown in FIG. 4.
Figure 7B:
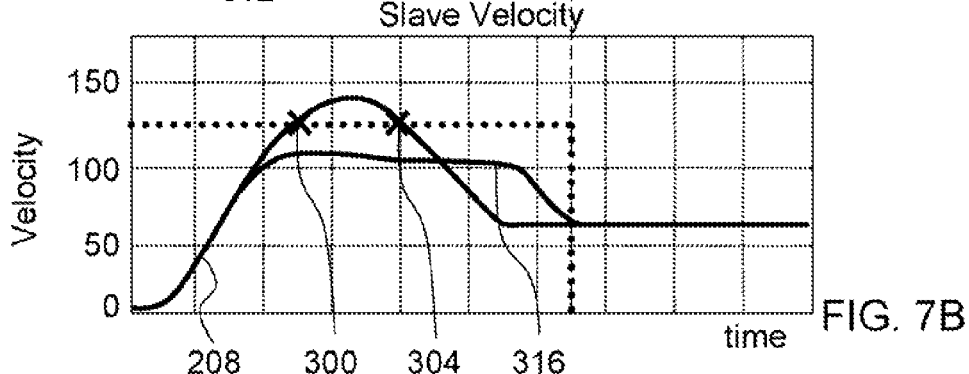
FIG. 7B shows one embodiment of a curve for adjusting the quintic ramp shown in FIG. 7A.

In one embodiment, as shown in FIG. 7A, position curve 200 is adjusted 308 by applying quintic-hermite splines to fit a plurality of points 312 onto position curve 200. More specifically, points 312 are fit to adjust curve 200 along curve 314 such that velocity curve 208 is repositioned, as shown in FIG. 7B by a new velocity curve 316. Specifically, position curve 200 is adjusted such that slave follower 108 does not exceed the maximum velocity. Although the exemplary embodiment shows only two points 312 fit to position curve 200, as will be appreciated by one of ordinary skill in the art, any number of points 312 can be fit to position curve 200. Specifically, points 312 are fit to position curve 200 until all of velocity curve 208 is repositioned below the maximum velocity.

Figure 8A:
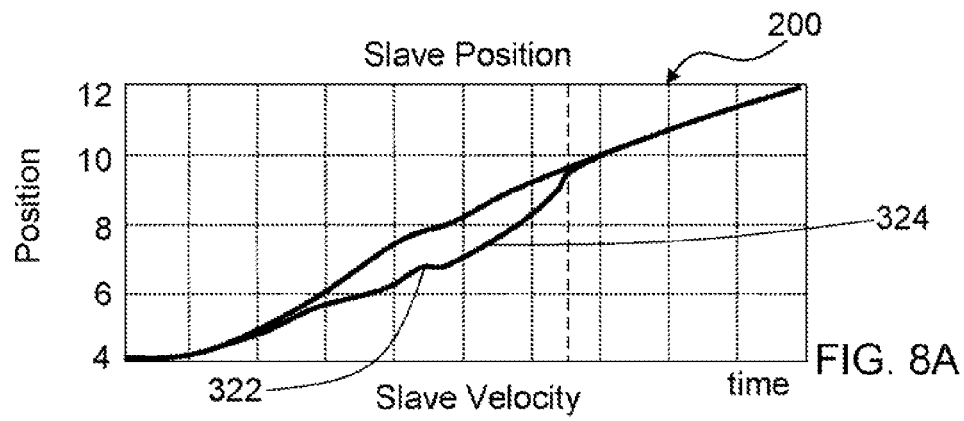
FIG. 8A shows the quintic ramp shown in FIG. 4.
Figure 8B:
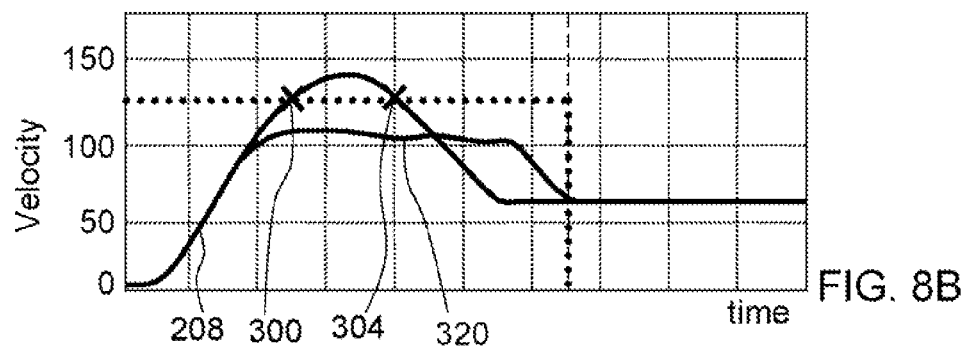
FIG. 8B shows an alternative embodiment of a curve for adjusting the quintic ramp shown in FIG. 8A.

In an alternative embodiment, as shown in FIG. 8A, position curve 200 is adjusted 308 by operating slave follower 108 off position curve 200. Slave follower 108 is then operated within the constraint as shown in FIG. 8B by line 320. Accordingly, position curve 200 is urged to follow curve 322. After slave follower 108 passes point 304, a new curve 324 is generated to urge or bring slave follower 108 onto position curve 200 from curve 322. Accordingly, curve 200 is repositioned according to the constraints placed on slave follower 108.

Although the methods of adjusting curve 200, as shown in FIGS. 7A and 7B and 8A and 8B, are described with respect to a constraint on the velocity of slave follower 108, as will be appreciated by one of ordinary skill in the art, the methods described herein can also be used to adjust curve 200 to accommodate constraints on the position, the velocity, and/or the acceleration of slave follower 108.

Accordingly, method 164 enables slave follower 108 to synchronize with master profile 120 within a time frame that facilitates maintaining a performance of system 100. In particular, in one embodiment, method 164 protects system 100 by limiting the behavior of slave follower 108. Further, method 164 allows for a wide range of behaviors for master source 104, for example, short or long moves, high or low velocities, and/or high or low accelerations. Moreover, in one embodiment, method 164 self-corrects if slave follower 108 approaches or exceeds a constraint.

In one embodiment, a method for synchronizing a slave follower with a master source is provided. The method includes defining a relationship between the master source and the slave follower, inputting a first position of the master source, and inputting a first position of the slave follower. The method also includes defining a second position where the slave follower synchronizes with the master source, and fitting a curve between the first position of the slave follower the second position. The curve is fit based on the relationship between the master source and the slave follower, the first position of the slave follower, the first position of the master source, and the second position. The curve is fit to synchronize the slave follower and the master source without exceeding pre-determined boundaries of the slave follower.

In an exemplary embodiment, the slave follower and the master source are motors. Further, in an exemplary embodiment, a quintic-hermite spline is applied to fit the curve. Moreover, in an exemplary embodiment, the slave follower is synchronized with the master source without at least one of placing constraints on the master source and removing constraints from the slave follower. In addition, in the exemplary embodiment, the slave follower is synchronized with the master profile without creating jerk in the slave follower.

In the exemplary embodiment, the method also includes adjusting the curve to account for a constraint on the slave follower. In one embodiment, the curve is adjusted to account for a constraint on the slave follower by applying a quintic-hermite spline to fit a plurality of points within the curve. In a second embodiment, the curve is adjusted to account for a constraint on the slave follower by operating the slave follower off the curve, operating the slave follower within the constraint while the slave follower is operated off the curve, and generating a new curve to urge the slave follower onto the curve.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Exemplary embodiments of systems and methods for controlling motion of a motor are described above in detail. The systems and methods illustrated are not limited to the specific embodiments described herein, but rather, components of the system may be utilized independently and separately from other components described herein. Further, steps described in the method may be utilized independently and separately from other steps described herein.

While the invention has been described in terms of various specific embodiments, those skilled in the art will recognize that the invention can be practiced with modification within the spirit and scope of the claims.

What is claimed is:

1. A computer implemented method for synchronizing a slave follower with a master source, said method comprising:
   defining a relationship between the master source and the slave follower;
   inputting a first position of the master source;
   inputting a first position of the slave follower;
   defining a second position where the slave follower synchronizes with the master source; and
   fitting a curve between the first position of the slave follower and the second position using a processor, the curve fit based on the relationship between the master source and the slave follower, the first position of the slave follower, the first position of the master source, and the second position, the curve fit to synchronize the slave follower and the master source without exceeding predetermined boundaries of the slave follower, wherein fitting the curve further comprises using a quintic-hermite spline.

2. A method in accordance with claim 1 further comprising synchronizing the slave follower with the master source without at least one of placing constraints on the master source and removing constraints from the slave follower.

3. A method in accordance with claim 1 further comprising adjusting the curve to account for a constraint on the slave follower by applying the quintic-hermite spline to fit a plurality of points within the curve.

4. A method in accordance with claim 1 further comprising adjusting the curve to account for a constraint on the slave follower by:
   operating the slave follower off the curve;
   operating the slave follower within the constraint while the slave follower is operated off the curve; and
   generating a new curve to urge the slave follower onto the curve.

5. A method in accordance with claim 1 further comprising synchronizing the slave follower with the master profile without creating jerk in the slave follower.

6. A method in accordance with claim 1 further comprising synchronizing a slave motor with a master motor.

7. A system comprising:
   a master source;
   a slave follower; and
   a processor configured to synchronize the slave follower with the master source by:
      defining a relationship between the master source and the slave follower;
      inputting a first position of the master source;
      inputting a first position of the slave follower;
      defining a second position where the slave follower synchronizes with the master source; and
      fitting a curve between the first position of the slave follower the second position, the curve fit based on the relationship between the master source and the slave follower, the first position of the slave follower, the first position of the master source, and the second position, the curve fit to synchronize the slave follower and the master source without exceeding pre-determined boundaries of the slave follower, wherein the processor is further configured to apply a quintic-hermite spline to fit the curve.

8. A system in accordance with claim 7 wherein the processor is further configured to synchronize the slave follower with the master source without at least one of placing constraints on the master source and removing constraints from the slave follower.

9. A system in accordance with claim 7 wherein the processor is further configured to adjust the curve to account for a constraint on the slave follower by applying the quintic-hermite spline to fit a plurality of points within the curve.

10. A system in accordance with claim 9 wherein the processor is further configured to adjust the curve to account for a constraint on the slave follower by:
   operating the slave follower off the curve;
   operating the slave follower within the constraint while the slave follower is operated off the curve; and
   generating a new curve to urge the slave follower onto the curve.

11. A system in accordance with claim 7 wherein the processor is further configured synchronize the slave follower with the master profile without creating jerk in the slave follower.

12. A system in accordance with claim 7 wherein the slave follower and the master source are motors.

13. A computer program embodied on a computer-readable medium, said computer program comprising at least one code segment configured to instruct a computer to synchronize a slave follower with a master source by:
   defining a relationship between the master source and the slave follower;
   inputting a first position of the master source;
   inputting a first position of the slave follower;
   defining a second position where the slave follower synchronizes with the master source; and
   fitting a curve between the first position of the slave follower the second position, the curve fit based on the relationship between the master source and the slave follower, the first position of the slave follower, the first position of the master source, and the second position, the curve fit to synchronize the slave follower and the master source without exceeding pre-determined boundaries of the slave follower, wherein the computer program further comprises at least one code segment configured to instruct the computer to apply a quintic-hermite spline to fit the curve.

14. A computer program in accordance with claim 13 wherein the computer program further comprises at least one code segment configured to instruct the computer to synchronize the slave follower with the master source without at least one of placing constraints on the master source and removing constraints from the slave follower.

15. A computer program in accordance with claim 13 wherein the computer program further comprises at least one code segment configured to instruct the computer to adjust the curve to account for a constraint on the slave follower by applying the quintic-hermite spline to fit a plurality of points within the curve.

16. A computer program in accordance with claim 13 wherein the computer program further comprises at least one code segment configured to instruct the computer to adjust the curve to account for a constraint on the slave follower by:
   operating the slave follower off the curve;
   operating the slave follower within the constraint while the slave follower is operated off the curve; and
   generating a new curve to urge the slave follower onto the curve.

17. A computer program in accordance with claim 13, wherein the computer program further comprises at least one code segment configured to instruct the computer to synchronize the slave follower with the master profile without creating jerk in the slave follower.

* * * * *